United States Patent
Czyzewski et al.

(10) Patent No.: US 7,303,122 B2
(45) Date of Patent: Dec. 4, 2007

(54) METHODS AND SYSTEMS FOR PROVIDING A FINANCIAL ACCOUNT CHARGING A FLAT AMOUNT

(75) Inventors: Nathan T. Czyzewski, Arlington, VA (US); Jonathan Ian Kernkraut, Washington, DC (US); Srishti Kohli, Falls Church, VA (US); Alihan Hotic, Arlington, VA (US); Hrushikesh Kar, Glen Allen, VA (US)

(73) Assignee: Capital One Financial Corporation, Falls Church, VA (US)

( * ) Notice: Subject to any disclaimer, the term of this patent is extended or adjusted under 35 U.S.C. 154(b) by 318 days.

(21) Appl. No.: 10/929,714

(22) Filed: Aug. 30, 2004

(65) Prior Publication Data

US 2006/0047592 A1   Mar. 2, 2006

(51) Int. Cl.
  *G06K 5/00* (2006.01)
(52) U.S. Cl. .................. 235/380; 705/35; 705/39; 705/40
(58) Field of Classification Search ............ 235/379, 235/380; 705/39, 35, 40
See application file for complete search history.

(56) References Cited

U.S. PATENT DOCUMENTS 5,933,817 A    8/1999 Hucal .................... 705/39
7,004,382 B2*  2/2006 Sandru .................. 235/379
2002/0173994 A1* 11/2002 Ferguson, III .............. 705/4
2003/0101131 A1*  5/2003 Warren et al. ............. 705/38

OTHER PUBLICATIONS

The New, 'Unflattened' Late-Payment Fees, *Credit Card Management*, Apr. 2002, vol. 15, Issue 1, p. 8.
"Calif. lawmakers approve tiered late fees," *American Banker*, Aug. 30, 1994, v. 159, n 167 p. 2(1).
"Chase Manhattan Weighs in with a Tiered Interest-Rate Package," *Faulkner & Gray, Inc.*, Sep. 1, 1992.

* cited by examiner

*Primary Examiner*—Daniel Hess
(74) *Attorney, Agent, or Firm*—Finnegan, Henderson, Farabow, Garrett & Dunner, L.L.P.

(57) ABSTRACT

Systems and methods are disclosed for providing a financial account. The disclosed systems and methods may include receiving financial transaction data, establishing a balance for the financial account based on the financial transaction data, and charging an amount to the financial account. The amount may comprise a fixed amount that may be the same for all values of the balance. Furthermore, the disclosed systems and methods may include charging an amount to the financial account in which the amount comprises a first fixed amount if the balance is less than or equal to a break-point value and in which the amount comprises a second fixed amount if the balance is greater than the break-point value. The first fixed amount may be the same for all values of the balance less than or equal to the break-point value. And the second fixed amount may be the same for all values of the balance greater than the break-point value.

12 Claims, 3 Drawing Sheets

METHODS AND SYSTEMS FOR PROVIDING A FINANCIAL ACCOUNT CHARGING A FLAT AMOUNT

BACKGROUND

I. Technical Field

The present invention generally relates to methods and systems for providing a financial account. More particularly, the present invention relates to providing a financial account charging a flat amount.

II. Background Information

Credit card products have become so universally well known and ubiquitous that they have fundamentally changed the manner in which financial transactions and dealings are viewed and conducted in society today. Credit card products are most commonly represented by plastic card-like items that are offered and provided to consumers through credit card issuers (such as banks and other financial institutions). With a credit card, an authorized consumer is capable of purchasing services and/or merchandise without an immediate, direct exchange of cash.

With present credit processing systems, the consumer presents a credit card or credit card number to a merchant. The merchant processes and transmits information, including credit card information and purchase amount, through an established system of electronic clearances and settlements to complete payment. The card issuer is notified of the pending transaction and is given an opportunity to approve it. If approved, a series of clearances and settlements among interchange participants (namely, the merchant, the acquiring bank, the card issuer, and/or the processing institution) results in the card issuer reimbursing the other participants in the process for the cost of the purchase. The card issuer then invoices the consumer for the amount of the purchase and may extend credit such that the consumer can pay the amount of the purchase over time.

In general, the card issuer provides the consumer with a monthly or otherwise periodic statement. The consumer may have the option to either fully pay the outstanding balance or, as a matter of necessity or choice, may defer at least a portion of the balance for later payment with accompanying interest or finance charges for the period during which payment of the outstanding debt is deferred. Following receipt of the statement, the consumer generally mails a check or money order to the card issuer.

Furthermore, interest or finance charges charged on the outstanding balance may be based on an interest rate. Accordingly, a different financial charge may result for each different balance value. Such uncertainty of the finance charge may cause a cardholder to hesitate to use the card. Accordingly, a credit card account having a predictable finance charge feature may create greater business opportunities for the credit card issuer.

In view of the foregoing, there is a need for methods and systems for providing a financial account more optimally. Furthermore, there is a need for providing a financial account charging a flat amount.

SUMMARY OF THE INVENTION

Consistent with embodiments of the present invention, systems and methods are disclosed for providing a financial account charging a flat amount.

In accordance with one embodiment, a method for providing a financial account comprises charging an amount to the financial account, the amount being fixed and being the same for all values of a balance for the financial account.

According to another embodiment, a method for providing a financial account comprises charging an amount to the financial account wherein the amount comprises a first fixed amount if a balance for the financial account is less than or equal to a break-point value and wherein the amount comprises a second fixed amount if the balance is greater than the break-point value, the first fixed amount being the same for values of the balance less than or equal to the break-point value, the second fixed amount being the same for values of the balance greater than the break-point value.

In accordance with yet another embodiment, a system for providing a financial account comprises a memory storage for maintaining a database and a processing unit coupled to the memory storage, wherein the processing unit is operative to charge an amount to the financial account, the amount being fixed and being the same for all values of a balance for the financial account.

In accordance with yet another embodiment, a system for providing a financial account comprising a memory storage for maintaining a database and a processing unit coupled to the memory storage, wherein the processing unit is operative to charge an amount to the financial account wherein the amount comprises a first fixed amount if a balance for the financial account is less than or equal to a break-point value and wherein the amount comprises a second fixed amount if the balance is greater than the break-point value, the first fixed amount being the same for values of the balance less than or equal to the break-point value, the second fixed amount being the same for values of the balance greater than the break-point value.

In accordance with yet another embodiment, a computer-readable medium which stores a set of instructions which when executed performs a method for providing a financial account, the method executed by the set of instructions comprising charging an amount to the financial account, the amount being fixed and being the same for all values of a balance for the financial account.

In accordance with yet another embodiment, a computer-readable medium which stores a set of instructions which when executed performs a method for providing a financial account, the method executed by the set of instructions comprising charging an amount to the financial account wherein the amount comprises a first fixed amount if a balance for the financial account is less than or equal to a break-point value and wherein the amount comprises a second fixed amount if the balance is greater than the break-point value, the first fixed amount being the same for values of the balance less than or equal to the break-point value, the second fixed amount being the same for values of the balance greater than the break-point value.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
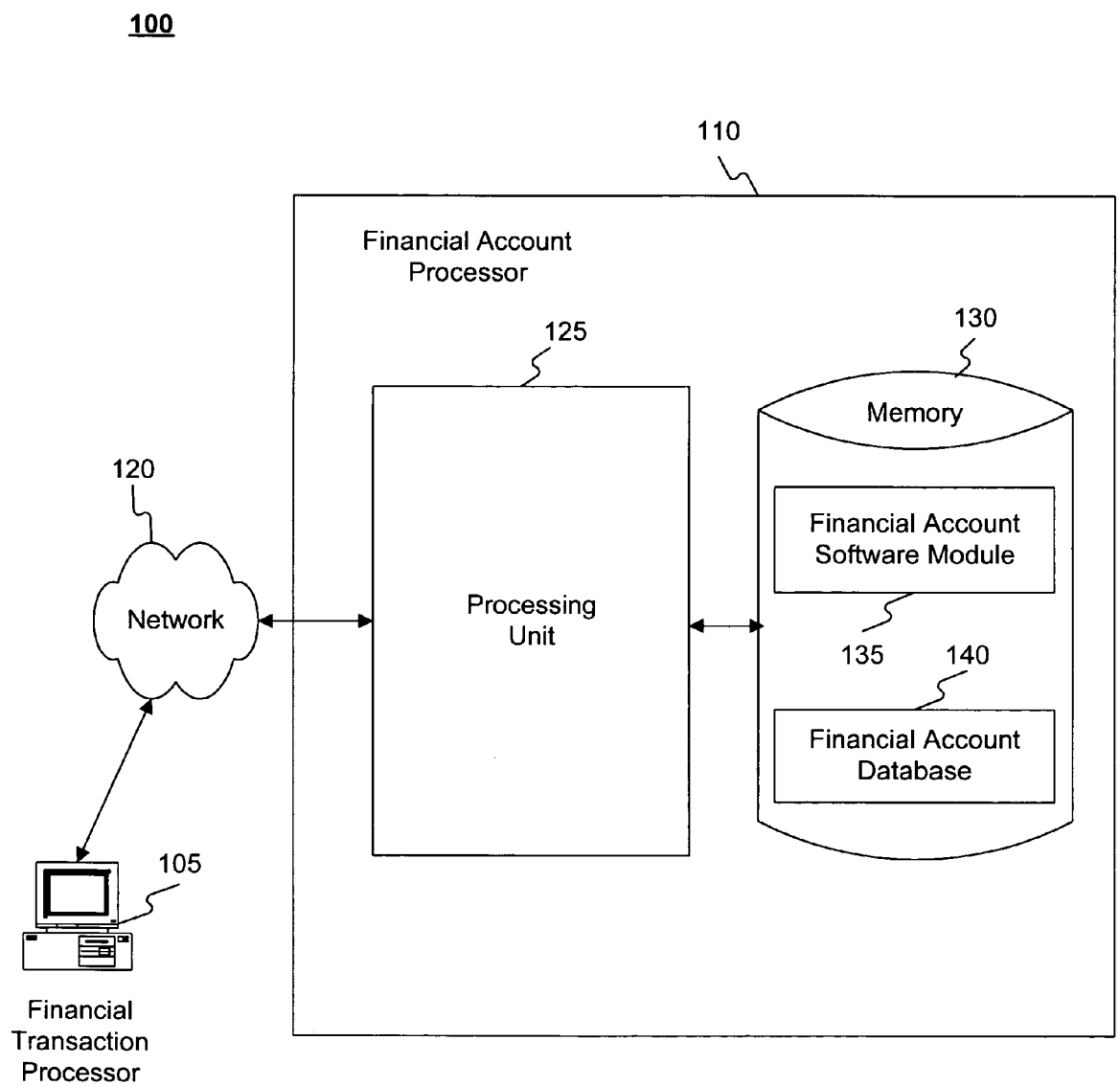
FIG. 1 is a block diagram of an exemplary system for providing a financial account consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Systems and methods consistent with embodiments of the present invention may provide a financial account. Embodiments of the invention may relate to a financial account, such as a credit card account or a line-of-credit, for example, that does not charge a finance charge or fee based on an interest rate to the accountholder's balance. Instead, a flat amount may be charged periodically. For example, regardless of the balance carried on the account, the accountholder may be charged a flat amount for each payment cycle, with no fees or interest charges based on the balance being applied. Alternatively, embodiments of the invention may vary the flat amount based on the balance falling within certain ranges. For example, no amount may be charged if the balance is less than $200, a $5.00 amount may be charges if the balance is greater than or equal to $200, but less than $1,000, and a $10 amount may be charged if the balance is greater than or equal to $1,000, but less than $2,000. Furthermore, embodiments of the invention may provide, for example, a line of credit with a periodic fee charged regardless of whether the accountholder uses the line of credit. For example, the accountholder may have a $15,000 line-of-credit and be charged $29.98 per month regardless of whether the accountholder uses the line-of-credit.

An embodiment consistent with the invention may comprise a system for providing a financial account. The system may comprise a memory storage for maintaining a database and a processing unit coupled to the memory storage. The processing unit may be operative to charge an amount to the financial account, the amount being fixed and being the same for all values of a balance for the financial account. In an alternate embodiment, the processing unit may be operative to charge an amount to the financial account wherein the amount comprises a first fixed amount if a balance for the financial account is less than or equal to a break-point value and wherein the amount comprises a second fixed amount if the balance is greater than the break-point value. The first fixed amount may be the same for values of the balance less than or equal to the break-point value and the second fixed amount may be the same for values of the balance greater than the break-point value.

Consistent with an embodiment of the present invention, the aforementioned memory, processing unit, and other components may be implemented in a financial account providing system, such as an exemplary financial account providing system 100 of FIG. 1. Any suitable combination of hardware, software and/or firmware may be used to implement the memory, processing unit, or other components. By way of example, the memory, processing unit, or other components may be implemented with any of a financial transaction processor 105 or a financial account processor 110, in combination with system 100. The aforementioned system and processors are exemplary and other systems and processors may comprise the aforementioned memory, processing unit, or other components, consistent with embodiments of the present invention.

Furthermore, the invention may be practiced in an electrical circuit comprising discrete electronic elements, packaged or integrated electronic chips containing logic gates, a circuit utilizing a microprocessor, or on a single chip containing electronic elements or microprocessors. The invention may also be practiced using other technologies capable of performing logical operations such as, for example, AND, OR, and NOT, including but not limited to mechanical, optical, fluidic, and quantum technologies. In addition, the invention may be practiced within a general purpose computer or in any other circuits or systems.

By way of a non-limiting example, FIG. 1 illustrates system 100 in which the features and principles of the present invention may be implemented. As illustrated in the block diagram of FIG. 1, system 100 may include financial transaction processor 105, financial account processor 110, and a network 120. Financial account processor 110 may include a processing unit 125 and a memory 130. Memory 130 may include a financial account software module 135 and a financial account database 140. Financial account software module 135 may be executed on processing unit 125 to perform embodiments of the inventions and may access financial account database 140.

Financial transaction processor 105 or financial account processor 110 ("the processors") included in system 100 may be implemented using a personal computer, network computer, mainframe, or other similar microcomputer-based workstation. The processors may though comprise any type of computer operating environment, such as hand-held devices, multiprocessor systems, microprocessor based or programmable sender electronic devices, minicomputers, mainframe computers, and the like. The processors may also be practiced in distributed computing environments where tasks are performed by remote processing devices. Furthermore, any of the processors may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and the processor may comprise other systems or devices.

Network 120 may comprise, for example, a local area network (LAN) or a wide area network (WAN). Such networking environments are commonplace in offices, enterprise-wide computer networks, intranets, and the Internet, and are known by those skilled in the art. When a LAN is used as network 120, a network interface located at any of the processors may be used to interconnect any of the processors. When network 120 is implemented in a WAN networking environment, such as the Internet, the processors may typically include an internal or external modem (not shown) or other means for establishing communications over the WAN. Further, in utilizing network 120, data sent over network 120 may be encrypted to insure data security by using known encryption/decryption techniques.

In addition to utilizing a wire line communications system as network 120, a wireless communications system, or a combination of wire line and wireless may be utilized as network 120 in order to, for example, exchange web pages via the Internet, exchange e-mails via the Internet, or for utilizing other communications channels. Wireless can be defined as radio transmission via the airwaves. However, it may be appreciated that various other communication techniques can be used to provide wireless transmission, including infrared line of sight, cellular, microwave, satellite, packet radio, and spread spectrum radio. The processors in the wireless environment can be any mobile terminal, such as the mobile terminals described above. Wireless data may include, but is not limited to, paging, text messaging, e-mail, Internet access and other specialized data applications specifically excluding or including voice transmission.

System 100 may also transmit data by methods and processes other than, or in combination with, network 120. These methods and processes may include, but are not limited to, transferring data via, diskette, CD ROM, facsimile, conventional mail, an interactive voice response system (IVR), or via voice over a publicly switched telephone network.

Figure 2:
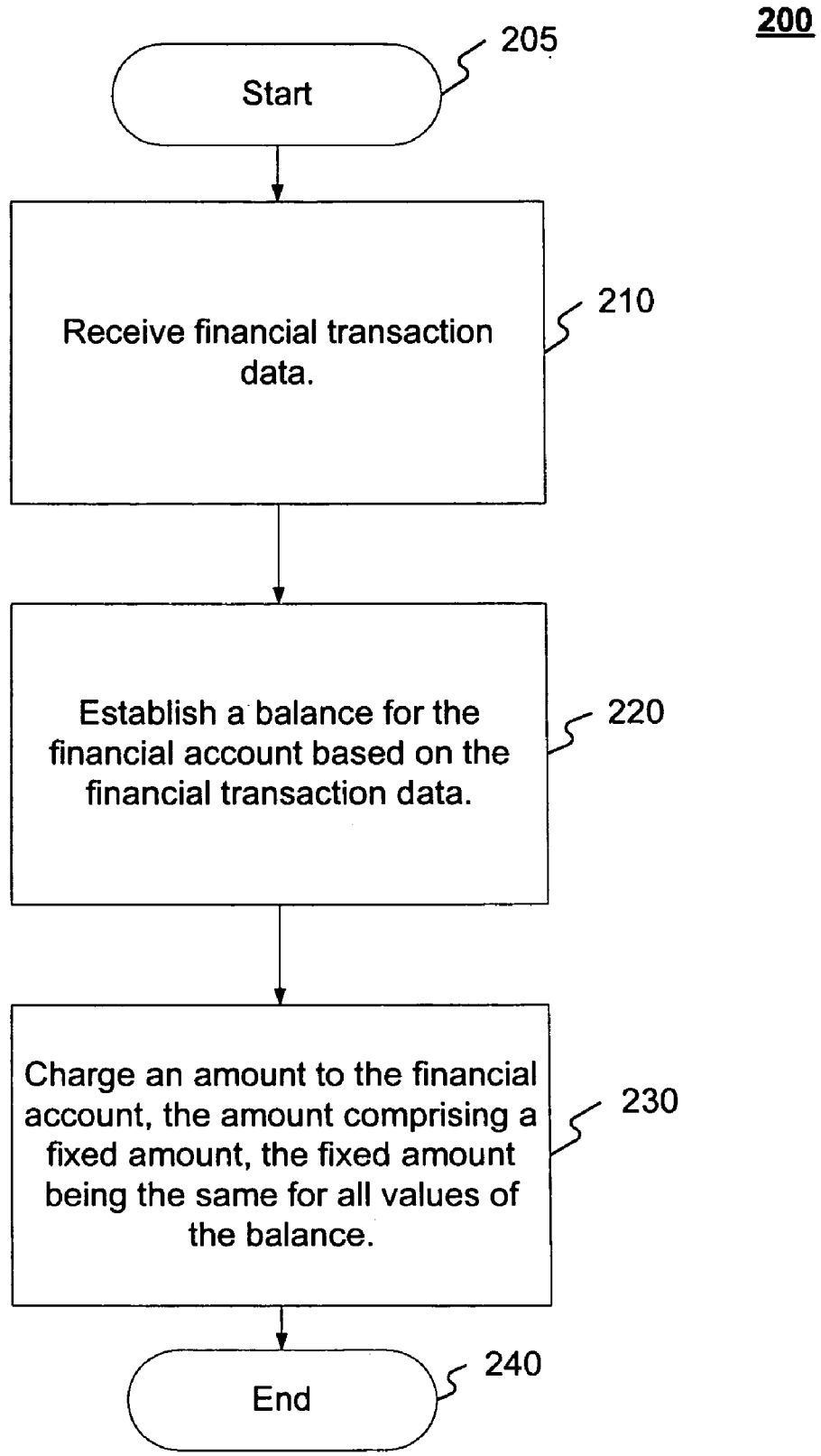
FIG. 2 is a flowchart of an exemplary method for providing a financial account consistent with an embodiment of the present invention.

FIG. 2 is a flow chart setting forth the general stages involved in an exemplary method 200 consistent with the invention for providing a financial account using system 100 of FIG. 1. Exemplary ways to implement the stages of exemplary method 200 will be described in greater detail below. Exemplary method 200 may begin at starting block 205 and proceed to stage 210 where processor 110 may receive financial transaction data. For example, processor 110 may receive the financial transaction data from financial transaction processor 105 over network 120. The financial transaction data may indicate, for example, a withdrawal from the financial account, a charge to the financial account, or a payment to the financial account. Financial transaction processor 105 may comprise a retail point-of-sale terminal that receives a charge to the financial account by a person authorized to make charges to the financial account. In addition, financial transaction processor 105 may comprise any processor used to process a accountholder's desire to withdraw from or make payments to a line-of-credit. Furthermore, financial transaction processor 105 may comprise a bank or financial account processor that receives payments associated with the financial account. Moreover, the financial account may comprise a line-of-credit or a credit card account, however, the financial account may comprise any type of financial account.

From stage 210, exemplary method 200 may advance to stage 220 where processor 110 may establish a balance for the financial account based on the financial transaction data. For example, processor 110 may extract payments, withdrawals, and/or charges from the financial transaction data. Furthermore, processor 110 may add the charges to the current balance of the financial account and may subtract payments and/or withdrawals from the current balance of the financial account. Accordingly, processor 110 may establish a balance for the financial account.

Once processor 110 establishes the balance for the financial account based on the financial transaction data in stage 220, exemplary method 200 may continue to stage 230 where processor 110 may charge an amount to the financial account. The amount may comprise a fixed amount that is the same for all values of the balance. For example, regardless of the balance carried on the financial account, the accountholder may be charged a flat fee or finance charge for each payment cycle, with no interest charges being applied. A flat amount of $10, for example, may be charged each month (or any other periodic cycle, for example) to the financial account no matter what the balance on the financial account is. After processor 110 charges the finance charge to the financial account in stage 230, exemplary method 200 may then end at stage 240.

Figure 3:
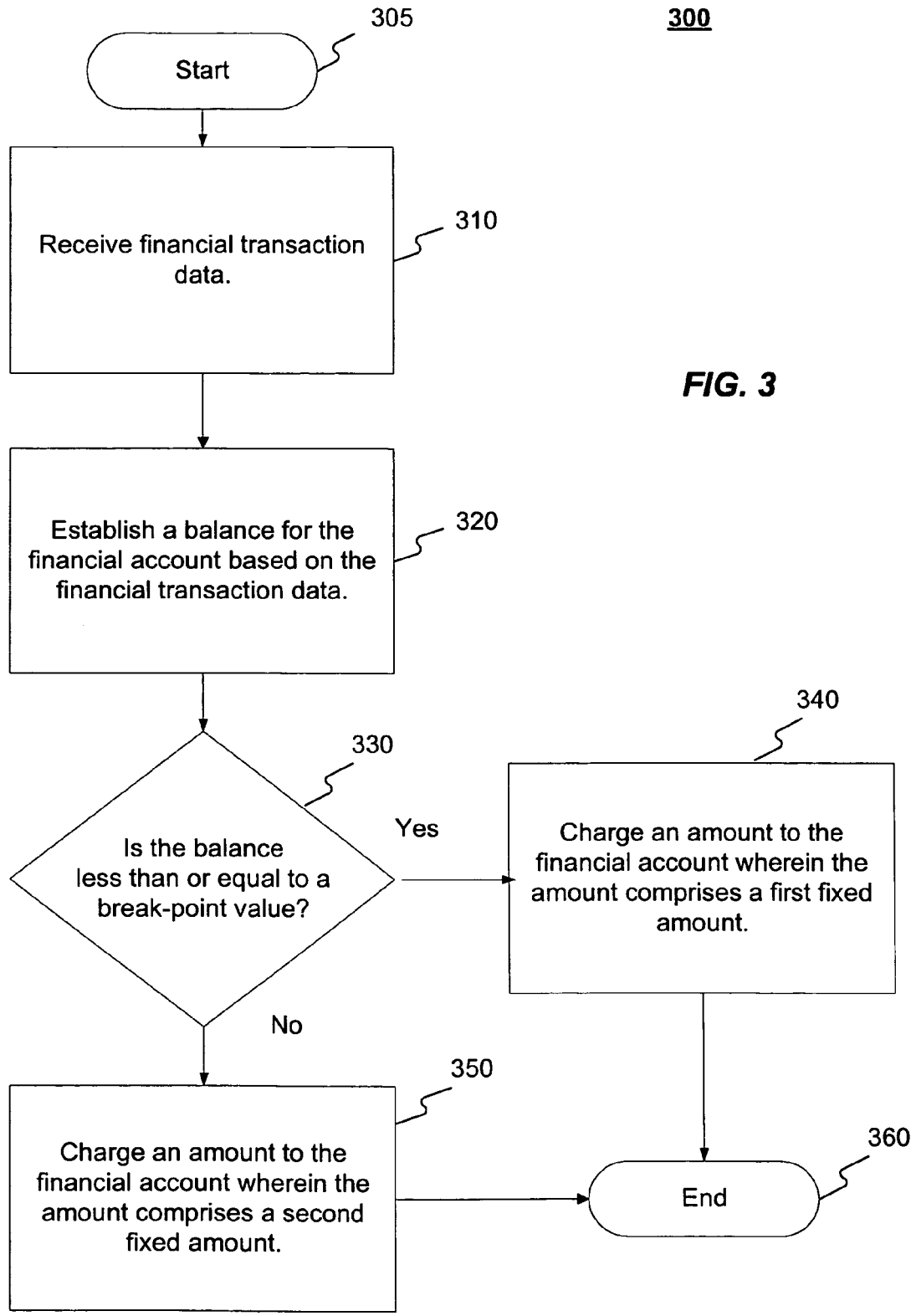
FIG. 3 is a flowchart of another exemplary method for providing a financial account consistent with another embodiment of the present invention.

FIG. 3 is a flow chart setting forth the general stages involved in an exemplary method 300 consistent with the invention for providing a financial account using system 100 of FIG. 1. Exemplary ways to implement the stages of exemplary method 300 will be described in greater detail below. Exemplary method 300 may begin at starting block 305 and proceed to stage 310 where processor 110 may receive financial transaction data. For example, the financial transaction data may be received in a similar manner to that described above with respect to stage 210.

From stage 310, where processor 110 receives the financial transaction data, exemplary method 300 may advance to stage 320 where processor 110 may establish a balance for the financial account based on the financial transaction data. For example, the balance may establish for the financial account in a similar manner to that described above with respect to stage 220.

Once processor 110 establishes the balance for the financial account based on the financial transaction data in stage 320, exemplary method 200 may continue to decision block 330 where processor 110 may determine if the balance is less than or equal to a break-point value. For example, the break-point value may comprise $200. In this example, processor 110 may determine if the balance for the financial account is less than or equal to $200.

From decision block 330, if processor 110 determines that the balance is less than or equal to the break-point value, exemplary method 300 may proceed to stage 340 where processor 110 may charge an amount to the financial account. The amount may comprise a first fixed amount and may be the same for all values of the balance less than or equal to the break-point value. For example, the first fixed amount may be $5.00 and the break-point value may be $200. In this example, processor 110 may charge an amount of $5.00 to the financial account if the balance is less than or equal to $200. Moreover, in this example, the amount may be $5.00 regardless of the balance value, so long as the balance value is less than or equal to $200.

From decision block 330, if processor 110 determines that that the balance is not less than or equal to the break-point value, exemplary method 300 may proceed to stage 350 where processor 110 may charge the amount to the financial account. The amount may comprise a second fixed amount. The second fixed amount may be the same for all values of the balance greater than the break-point value. For example, the second fixed amount may be $10.00 and the break-point value may be $200. In this case, processor 110 may charge an amount of $10.00 to the financial account if the balance is greater than $200. In this example, the amount may be $10.00 regardless of the balance value, so long as the balance value is greater than $200. After processor 110 charges the amount to the financial account comprising the first fixed amount in stage 340, or after processor 110 charges the amount to the financial account comprising the second fixed amount in stage 350, exemplary method 300 may then end at stage 360.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method of calculating a balance of a financial account for a periodic cycle, comprising:
   receiving financial transaction data related to the financial account;
   establishing a balance of the financial account based on the received financial transaction data;
   comparing the established balance to a predetermined break-point value;
   adding a first predetermined fixed amount to the established balance of the financial account if the established balance of the financial account is less than or equal to the break-point value; and
   adding a second predetermined fixed amount to the established balance of the financial account if the established balance of the financial account is greater than the break-point value,
   wherein the established balance of the financial account is not adjusted based on an interest rate for the periodic cycle.

2. The method of claim 1, wherein the financial transaction data comprises at least one of a withdrawal from the financial account, a charge to the financial account, and a payment to the financial account.

3. The method of claim 1, wherein the financial account comprises one of a credit card account and a line-of-credit.

4. The method of claim 1, wherein the second predetermined fixed amount is greater than the first predetermined fixed amount.

5. A system for calculating a balance of a financial account for a periodic cycle, comprising:
   a memory storage for maintaining a database; and
   a processing unit coupled to the memory storage area, wherein the processing unit is operative to:
   receive financial transaction data related to the financial account;
   establish a balance of the financial account based on the received financial transaction data;
   compare the established balance to a predetermined break-point value;
   add a first predetermined fixed amount to the established balance of the financial account if the established balance of the financial account is less than or equal to the break-point value; and
   add a second predetermined fixed amount to the established balance of the financial account if the established balance of the financial account is greater than the break-point value,
   wherein the established balance of the financial account is not adjusted based on an interest rate for the periodic cycle.

6. The system of claim 5, wherein the financial transaction data comprises at least one of a withdrawal from the financial account, a charge to the financial account, and a payment to the financial account.

7. The system of claim 5, wherein the financial account comprises one of a credit card account and a line-of-credit.

8. The system of claim 5, wherein the second predetermined fixed amount is greater than the first predetermined fixed amount.

9. A computer-readable medium including program instructions for performing, when executed by a processor, a method of calculating a balance of a financial account for a periodic cycle, comprising:
   receiving financial transaction data related to the financial account;
   establishing a balance of the financial account based on the received financial transaction data;
   comparing the established balance to a predetermined break-point value;
   adding a first predetermined fixed amount to the established balance of the financial account if the established balance of the financial account is less than or equal to the break-point value; and adding a second predetermined fixed amount to the established balance of the financial account if the established balance of the financial account is greater than the break-point value,
   wherein the established balance of the financial account is not adjusted based on an interest rate for the periodic cycle.

10. The computer-readable medium of claim 9, wherein the financial transaction data comprises at least one of a withdrawal from the financial account, a charge to the financial account, and a payment to the financial account.

11. The computer-readable medium of claim 9, wherein the financial account comprises one of a credit card account and a line-of-credit.

12. The computer-readable medium of claim 9, wherein the second predetermined fixed amount is greater than the first predetermined fixed amount.

* * * * *